Dec. 17, 1963   C. H. FOSTER ETAL   3,114,257
APPARATUS FOR SENSING THE FLOW OF A SUBSTANCE
THROUGH A LIQUID MEDIUM
Filed March 9, 1959                           2 Sheets-Sheet 1
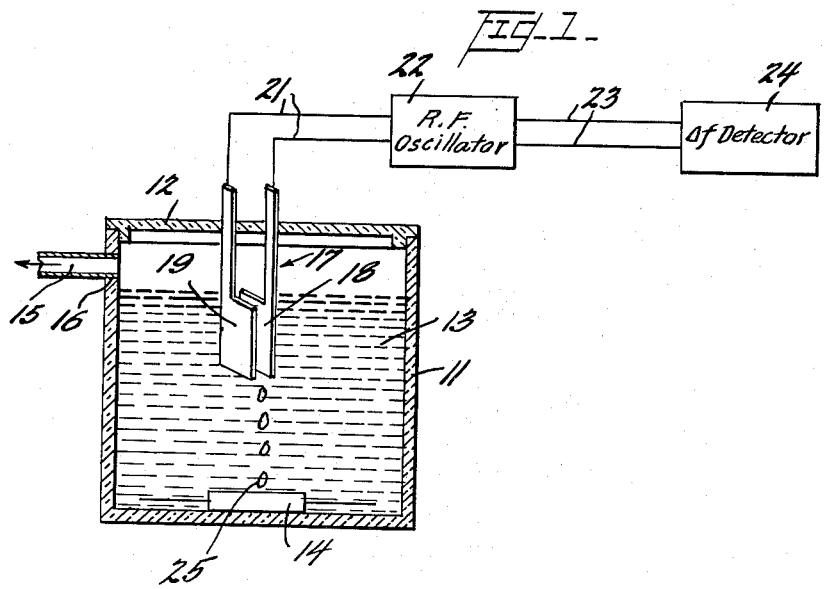
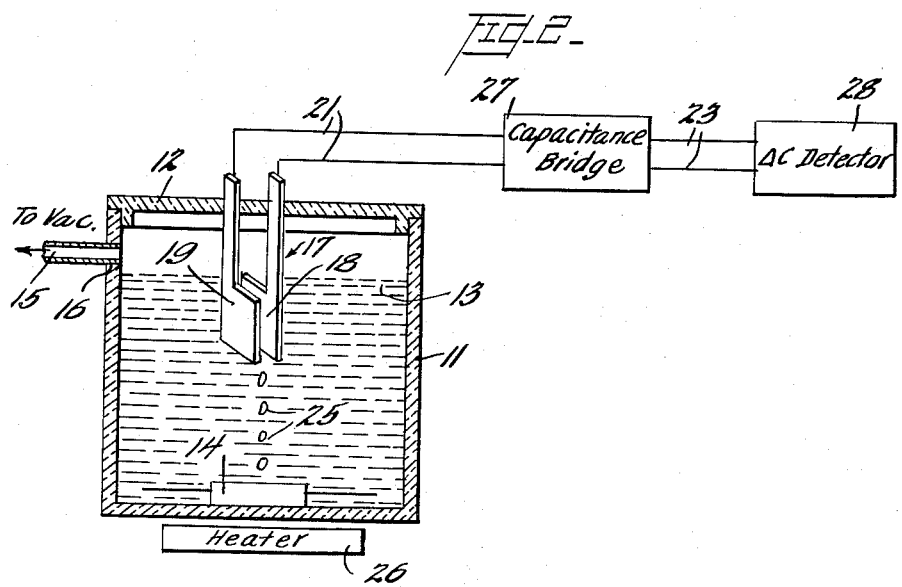
INVENTORS
Charles H. Foster
Jerry D. Lewis
BY   C. B. Hamilton
ATTORNEY Dec. 17, 1963
C. H. FOSTER ETAL  3,114,257
APPARATUS FOR SENSING THE FLOW OF A SUBSTANCE
THROUGH A LIQUID MEDIUM
Filed March 9, 1959
2 Sheets-Sheet 2
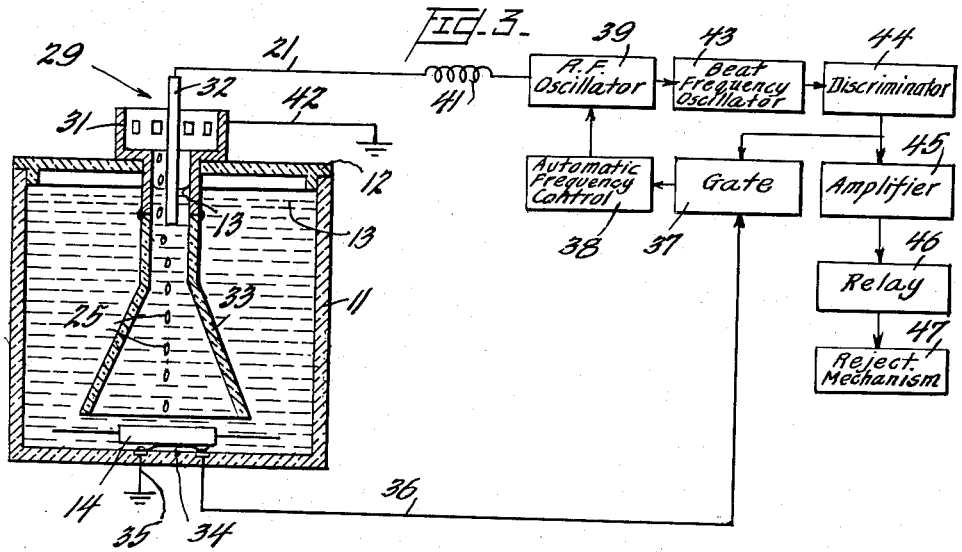
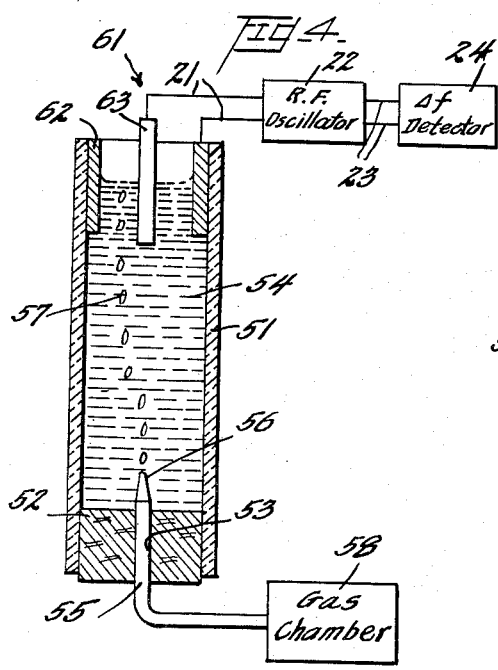
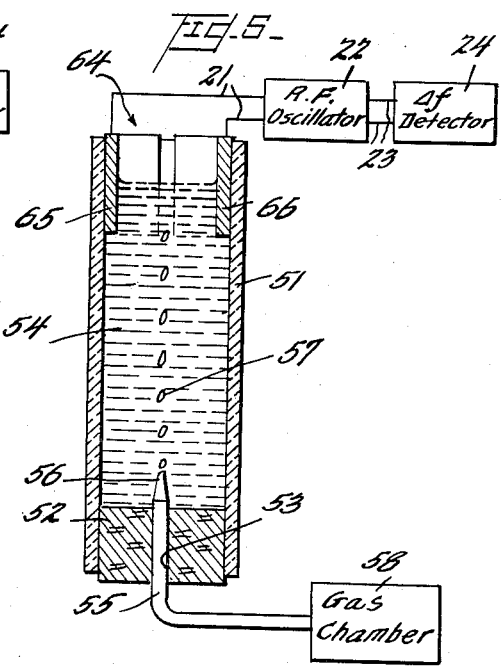
INVENTORS
Charles H. Foster
Jerry D. Lewis
BY C. B. Hamilton
ATTORNEY

United States Patent Office 3,114,257
Patented Dec. 17, 1963

3,114,257
APPARATUS FOR SENSING THE FLOW OF A SUBSTANCE THROUGH A LIQUID MEDIUM
Charles H. Foster, North Wilkesboro, and Jerry D. Lewis, Winston-Salem, N.C., assignors to Western Electric Company, Incorporated, New York, N.Y., a corporation of New York
Filed Mar. 9, 1959, Ser. No. 798,046
3 Claims. (Cl. 73—45.5)

This invention relates to an apparatus for sensing the flow of a substance through a liquid medium and more particularly to an apparatus for electrically sensing by means of a capacitor the flow of a substance through a liquid medium.

In the past many apparatus for the detection of the flow of a gas, liquid, or solid in a liquid have been devised. One such apparatus for flow detection includes an electrical resistance cell wherein a plurality of gas bubbles are channeled through a liquid medium past the electrodes of the cell. The gas bubbles cause a change in the effective electrical resistance of the cell, such change being a measure of the rate of gas bubble flow.

Another apparatus for flow detection includes photoelectric sensing means to determine the flow of liquid globules through another liquid of a greater specific gravity.

An object of the invention is to provide an apparatus for sensing the flow of a substance through a liquid medium.

Another object of the invention is the provision of an apparatus for sensing by means of a capacitor the flow of a substance through a liquid medium.

Apparatus illustrating certain features of this invention may include a quiescent liquid dielectric and means for containing the dielectric. A capacitor having its electrodes partially immersed in the dielectric is mounted upon the dielectric containing means. An inverted funnel or the like may be placed within the liquid dielectric for collecting and channeling between the capacitor electrodes a substance to be sensed. Electrical sensing means such as a capacitance bridge is connected electrically to the capacitor to indicate a change in capacitance upon the passing of a substance through the quiescent liquid dielectric and between the capacitor electrodes, such change being an indication of the presence of the substance and the rate thereof.

A complete understanding of the invention may be had from a fully detailed description of a specific embodiment thereof when read in conjunction with the appended drawings, in which:

FIG. 1 is a sectional view of a first embodiment of the invention with electrical circuitry in schematic;

FIG. 2 discloses a perspective view, partly in section, of a second embodiment of the invention;

FIG. 3 shows a third embodiment of the invention partly in section and partly in schematic;

FIG. 4 depicts a fourth embodiment of the invention partly in sections and partly in schematic; and FIG. 5 shows a fifth embodiment of the invention partly in section and in schematic.

Shown in FIG. 1 is a water-tight liquid container 11 of an insulating material, such as glass or the like, having a lid 12, and holding a quiescent liquid dielectric 13 of a chemically covalent compound (non-ionizable compound) such as oil or the like. Submerged within the liquid dielectric 13 is a gas containing component 14, such as a deposited carbon resistor or the like to be tested for gas leaks.

A cylindrical tube 15 is fixed within an aperture 16 in the container above the surface of the liquid dielectric 13 and provides a convenient means of removing any gas forming on the surface of the liquid dielectric. FIG. 1 also discloses a parallel plate capacitor, designated generally by the numeral 17, having a first electrode 18 and a second electrode 19 in space opposition thereto. The parallel plate capacitor 17 is mounted securely to the lid 12 of the liquid dielectric container by some appropriate means (not shown) and is partially immersed within the liquid dielectric 13 when the lid 12 is placed on the container 11. Connected electrically to the parallel plate capacitor 17 by means of leads 21 is a radio frequency oscillator 22 which is connected electrically by leads 23 to a frequency change ($\Delta f$) detector 24.

In operation, the component 14 to be tested for leaks is submerged within the quiescent liquid dielectric 13. If the component is not air-tight, gas 25 will leak from the component 14, and due to the specific gravity of the gas 25 with respect to the liquid dielectric 13, the gas will rise between the electrodes 18 and 19 of the parallel plate capacitor 17 to the surface of the quiescent liquid dielectric 13. The flow of gas 25 between the electrodes 18 and 19 will cause a change in the dielectric 13 of the parallel plate capacitor 17, i.e., the flow of gas 25 will change the dielectric 13 from a liquid to a mixture of a liquid and a gas. Such change in dielectric causes a corresponding change in the effective electrical capacitance of the parallel plate capacitor 17. This change in capacitance causes a corresponding change in frequency output of the R.F. oscillator 22, which is sensed by the $\Delta f$ detector 24 to give an indication of a leaky component 14.

Referring to FIG. 2, there is shown the second embodiment of the invention similar to the first embodiment shown in FIG. 1 except that in this second embodiment a heater 26 is provided to cause the gas in the component 14 to expand. This expansion of gas within the component 14 causes the gas pressure therein to correspondingly increase and thereby cause any gas to readily emit from a faulty component.

The provision of a vacuum to the tube 16 in the second embodiment of the invention causes a decrease in pressure on the surface of the quiescent liquid dielectric 13 so as to likewise cause any leaking gas to more readily emit from a faulty component.

Also, in the second embodiment a conventional capacitance bridge 27 incorporating appropriate amplifying means (not shown) senses any change in capacitance of the parallel plate capacitor 17. Any output from the capacitance bridge 27 is sensed by a change of capacitance ($\Delta c$) detector 28, which, when actuated, gives an indication of a leaky component 14.

The third embodiment of the invention is shown in FIG. 3 and in similar to the first embodiment of FIG. 1 with several exceptions. In the third embodiment, a concentric capacitor designated generally by the numeral 29, having a hollow cylindrical outer electrode 31 and a co-axially mounted solid inner electrode 32, is mounted fixedly to the lid 12 of the liquid dielectric container 11. Both the outer electrode 31 and the inner electrode 32 are partially immersed in the quiescent liquid dielectric 13. Fixedly coupled to the outer electrode 31 and insulated therefrom is a hood 33 for collecting any gas 25 escaping from the component 14.

At the bottom of the container 11 there is fixed a switch, designated generally by the numeral 34, upon which the component 14 to be tested for gas leaks is placed. One contact of the switch 34 is grounded by lead 35 while the other is connected electrically by lead 36 to a gate 37 which is in series relationship with an automatic frequency control 38. A radio frequency oscillator 39, in series with an inductance coil 41, is connected electrically by lead 21 to the inner electrode 32 of capacitor 29. The outer electrode 31 is grounded by lead 42. The capacitor 29 and the inductance coil 41, both in conjunction with the R.F. oscillator 39, comprise a series resonant circuit having a predetermined resonant frequency which is maintained substantially constant by the automatic frequency control 38 prior to the positioning of the component 14 for test. Any output of the R.F. oscillator 39 is fed into a beat frequency oscillator 43 which is in series with a discriminator 44, an amplifier 45, a relay 46, and a reject mechanism 47. Any output of the discriminator 44 is also fed back into the automatic frequency control 38 through the gate 37 prior to positioning the component 14 for test. Such feedback monitors the drift of the R.F. oscillator 39 by directing the automatic frequency control 38 as to the amount of control necessary.

In operation, the R.F. oscillator 39 produces a resonant frequency which is a function of the value of the capacitor 29, the value of the inductance coil 41, and the inherent characteristics of the R.F. oscillator 39. The resonant frequency, as mentioned before, is maintained constant by the automatic frequency control 38 prior to the positioning of a component 14 for test at the bottom of the container 11. Once a component is positioned at the bottom of the container 11 for test, the contacts of switch 34 are closed thereby rendering the gate 37 operative. With the gate 37 operative, the automatic frequency control 38 is cut off whereupon the R.F. oscillator 39 is conditioned to produce a frequency other than the aforementioned resonant frequency.

Assuming the component 14, positioned for test, does not have a gas leak, gas bubbles 25 will not appear, the dielectric 13 of the capacitor 29 will not change, and the output of the R.F. oscillator 39 will be substantially the aforementioned resonant frequency. Such resonant frequency when fed into the beat frequency oscillator 43 will produce no output; hence, the rejector mechanism 47 will remain inoperative, thereby giving an indication that the component 14 is satisfactory since it has no gas leak.

On the other hand, if the component 14 has a gas leak, gas bubbles 25 are emitted from the component 14 and pass between the electrodes 31 and 32 of the capacitor 29. Such gas bubbles 25 cause the capacitor dielectric 13 to change which causes the tuning of the circuit, comprising the capacitor 29, the inductance coil 41, and the R.F. oscillator 39, to change.

With the change of tuning, the R.F. oscillator 39 produces an output frequency which differs substantially from the predetermined resonant frequency. This output frequency produces a beat frequency upon such output being fed into the beat frequency oscillator 43.

The output of the beat frequency oscillator 43 is fed into the discriminator 44, which comprises a selective filter system. The discriminator 44 separates the frequencies fed into it from the beat frequency oscillator 43 so as to produce an output signal which is fed into the amplifier 45. With the discriminator output fed into the amplifier 45, a signal of increased amplitude is fed into the relay 46, thereby rendering it operative so as to actuate the reject mechanism 47.

In the above described circuit, which is represented in FIG. 3 as a block diagram, the circuit is appropriately grounded in order to complete the circuit to the capacitor 29 and the switch 34.

Also, the heater 26 and vacuum creating means (not shown) used in FIG. 2 could likewise be used with this third embodiment. Further, the hood 33 of FIG. 3 could be used with the embodiments of FIGS. 1, 2, 4, and 5.

There is depicted in FIG. 4 gas flow measuring apparatus as a fourth embodiment of the invention. The gas flow measuring apparatus includes a hollow cylindrical tube 51 of an insulating material, such as glass or the like. A stopper 52 composed of cork, rubber, or the like, having a vertical axial bore 53 therein, is forced into the lower end of the tube 51 so as to make a "water-tight" seal between the stopper 52 and the tube 51. The tube 51 is used to contain a quiescent liquid dielectric 54. Forced into the bore 53 of the stopper 52 is a tube 55 having a restrictive orifice 56 for emitting a gas 57 to be measured. Terminating in a gas chamber 58 for supplying the gas 57 to be measured is the other end of tube 55.

A concentric capacitor, designated generally by the numeral 61, having a hollow cylindrical outer electrode 62 fixed to the inner wall of the hollow cylindrical tube 51 and a solid cylindrical inner electrode 63, is positioned coaxially within the outer electrode 62 by means not shown. The R.F. oscillator 22 is connected electrically to the concentric capacitor 61 by means of leads 21 and to the ($\Delta f$) detector 24 by means of leads 23.

In operation, the gas 57 to be measured is directed into the liquid dielectric 54 between the electrodes 62 and 63 so as to cause a change in dielectric of the concentric capacitor 61. Such change in dielectric causes a corresponding change in the effective electrical capacitance of the capacitor 61. The change in capacitance will likewise cause a change in frequency output of the R.F. oscillator 22 which is sensed by the ($\Delta f$) detector 24 to give an indication of the flow of gas 57 as a function of frequency change ($\Delta f$).

FIG. 5 represents a fifth embodiment of the invention which is similar to FIG. 4 except that a capacitor, generally designated by the numeral 64, is used in place of the concentric capacitor 61 of FIG. 4. The capacitor 64 of FIG. 5 includes a first electrode 65 in space opposition to a second electrode 66, both electrodes 65 and 66 being semicircular in cross section and fixed to the inner surface of the hollow cylindrical tube 51.

It should be understood that the embodiments of FIGS. 4 and 5 could be used to measure the flow of a liquid or granular solid which is insoluble and/or immiscible in the quiescent liquid dielectric 54 and having a specific gravity different than that of the liquid dielectric 54.

It should be further understood that the above-described embodiments of the invention are merely illustrative and that numerous modifications may be made within the spirit and scope of the invention.

What is claimed is:

1. An apparatus for testing an article for gas leaks comprising a quiescent liquid dielectric, means for containing the dielectric in which the article is submerged for testing, a capacitor having electrodes immersed in the dielectric, means located within the dielectric for directing between the electrodes any gas that may leak from said article, said electrodes being mounted on and insulated from the gas directing means, an oscillator connected to the capacitor, an automatic frequency control connected to the oscillator for maintaining its output constant prior to the positioning of the article for test, a gate connected to the automatic frequency control, a switch connected to the gate and located in the bottom of the dielectric containing means upon which the article to be tested is positioned to close the switch contacts to actuate the gate thereby rendering the automatic frequency control inoperative so as to allow the oscillator output to change from a predetermined frequency value upon the flow of leaking gas through the quiescent liquid dielectric and between the electrodes, and means connected to the oscillator for detecting any change in frequency thereof to indicate a gas leak in the article.

2. An apparatus for testing a deposited carbon resistor for gas leaks which comprises a liquid, a container for holding the liquid, a gate, means fixed to the bottom of the container and actuated by the presence of the resistor for rendering the gate operative, and means conditioned by the operation of the gate for sensing the presence of any gas leaking from the resistor through the liquid.

3. An apparatus for testing an article for gas leaks, comprising a quiescent liquid dielectric, means for containing the dielectric in which the article is submerged for testing, a capacitor having electrodes immersed in the dielectric, means located within the dielectric for directing between the electrodes any gas that may leak from the article, a gate, a switch connected to the gate and located at the bottom of the dielectric containing means upon which the article to be tested is positioned to close the switch to actuate the gate, and means connected to the capacitor and conditioned by the operation of the gate for detecting a change in the dielectric strength of the dielectric between the capacitor electrodes due to a leaking gas emanating from the article and flowing between the electrodes.

References Cited in the file of this patent

UNITED STATES PATENTS

| | | |
|---|---|---|
| 1,826,886 | Keeler | Oct. 13, 1931 |
| 1,913,436 | Eckstein | June 13, 1933 |
| 1,928,969 | Kuffel | Oct. 3, 1933 |
| 1,995,699 | Baker et al. | Mar. 26, 1935 |
| 1,999,215 | Smith | Apr. 30, 1935 |
| 2,408,202 | Dickman | Sept. 24, 1946 |
| 2,506,143 | Edelman | May 2, 1950 |
| 2,540,658 | De Giers et al. | Feb. 6, 1951 |
| 2,562,972 | Wald | Aug. 7, 1951 |
| 2,658,819 | Formwalt | Nov. 10, 1953 |
| 2,719,287 | Bartlett | Sept. 27, 1955 |
| 2,720,624 | Gunst et al. | Oct. 11, 1955 |
| 2,892,976 | Tahyer | June 30, 1959 |
| 2,961,869 | Bagno | Nov. 29, 1960 |
| 3,033,023 | Hooper et al. | May 8, 1962 |

FOREIGN PATENTS

| | | |
|---|---|---|
| 206,466 | Australia | Feb. 1, 1957 |

OTHER REFERENCES

Ser. No. 360,689, Schrader (A.P.C.), published May 18, 1943.